(12) United States Patent
Mayer et al.

(10) Patent No.: US 6,550,324 B1
(45) Date of Patent: Apr. 22, 2003

(54) METHOD AND SENSOR FOR MEASURING A MASS FLOW

(75) Inventors: Felix Mayer, Zürich (CH); Moriz Lechner, Zürich (CH)

(73) Assignee: Sensirion AG, Zürich (CH)

( * ) Notice: Subject to any disclaimer, the term of this patent is extended or adjusted under 35 U.S.C. 154(b) by 0 days.

(21) Appl. No.: 09/856,441

(22) PCT Filed: Dec. 8, 1999

(86) PCT No.: PCT/IB99/01953

§ 371 (c)(1),
(2), (4) Date: Sep. 4, 2001

(87) PCT Pub. No.: WO00/37895

PCT Pub. Date: Jun. 29, 2000

(30) Foreign Application Priority Data

Dec. 22, 1998 (CH) ............................................. 2535/98

(51) Int. Cl.[7] ................................................. G01F 1/68
(52) U.S. Cl. ................................................... 73/204.14
(58) Field of Search ...................... 73/204.14, 204.17, 73/204.26

(56) References Cited

U.S. PATENT DOCUMENTS 3,905,230 A * 9/1975 Calvet et al. ............. 73/204.17
4,651,564 A    3/1987 Johnson et al. .......... 73/204.26

FOREIGN PATENT DOCUMENTS

EP    0698786    2/1996    .......... G01N/27/18

OTHER PUBLICATIONS

F. Mayer, A. Haberli, H. Jacobs, G. Ofner, O. Paul, and H. Baltes; "Single–chip CMOS Anemometer," IEEE International Electron Devices Meeting 1997, p. 895–898.
F. Mayer, G. Salis, J. Funk, O. Paul and H. Baltes; "Scaling of Thermal CMOS Gas Flow Microsensors: Experiment and Simulation," IEEE Micro Electro Mechanical Systems 1996, p. 116–121.

* cited by examiner

*Primary Examiner*—Max Noori
*Assistant Examiner*—Takisha S Miller
(74) *Attorney, Agent, or Firm*—Cooper & Dunham LLP; Donald S. Dowden

(57) ABSTRACT

A heating element (4) is arranged between two temperature sensors (5, 6) in order to measure the mass flow of a liquid or a gas. The mass flow is determined from the temperature difference of the temperature sensors (5, 6). The heating element (4) is operated by pulses in order to reduce power consumption of the device. A further reduction of the power consumption is reached by means of a monitoring circuit (12), which switches the actual measuring section (11) on only if the signals from the temperature sensors (5, 6) fulfil a threshold condition.

17 Claims, 2 Drawing Sheets

METHOD AND SENSOR FOR MEASURING A MASS FLOW

CROSS REFERENCE TO RELATED APPLICATIONS

This application claims the priority of Swiss patent application 2535/98, filed Dec. 22, 1998, the disclosure of which is incorporated herein by reference in its entirety.

BACKGROUND

The invention relates to a method and a sensor for measuring the mass flow of a gas or a liquid according to the preamble of the independent claims.

Devices of this type are described in "Scaling of Thermal CMOS Gas Flow Microsensors: Experiment and Simulation" by F. Mayer et al., in Proc. IEEE Micro Electro Mechanical Systems (IEEE, 1996), pp. 116ff or in "Single-Chip CMOS Anemomenter" by F. Mayer et al., Proc. IEEE International Electron Devices Meeting (IEDM, 1997), pp. 895ff. They are used for determining the mass flow of gases or fluids. They contain a heating element, which is arranged between two temperature sensors. The temperature difference between the two temperature sensors is an indicator for the mass flow.

Such sensors have a comparatively large power consumption. It is therefore endeavored to keep the current through the heating element as low as possible, at the expense, however, of accuracy.

U.S. Pat. No. 4,651,564 describes a sensor where the heating element is operated in pulsed manner, wherein the pulses are as long as the pauses between the pulses. This pulsed operation serves to increase measuring accuracy. A reduction of power consumption is, however, not an object of this document.

EP-A-698 786 describes a device comprising a heating element operated by differing heating currents. The heating element is used as temperature sensor at the same time. Measurements at differing heating currents are required for determining the flow to be measured.

SUMMARY OF THE INVENTION

It is therefore an aim to provide a sensor and a method, respectively, of the type mentioned initially that operate with a low power consumption.

This aim is reached by the object of the independent claims.

According to the invention the heating element is therefore operated in cycles, wherein in a first, shorter cycle phase more heating occurs than in a second, longer cycle phase. Thus, it can e.g. remain switched off in the second cycle phase, or be operated with lower power.

By means of this pulsed operation the power consumption can be reduced substantially. Still it remains possible, by processing the two sensor signals, to determine the mass flow. Preferably, the pulse length or switch-on time of the heating element is chosen for this purpose such that a thermal equilibrium is reached and the mass flow can be determined in substantially conventional manner.

In a preferred embodiment the sensor is provided with a monitoring circuit, which periodically checks the temperature signals. As soon as these temperature signals fulfil a given threshold condition, a measuring circuit is put into operation, which accurately determines the mass flow. In this way the power requirements can be reduced further.

Preferably, differing modes of operation are provided. In a first mode with reduced power consumption, only very short heating pulses are generated, while the pulses in the second heating mode are longer. This allows to use, if necessary, a mode of operation with reduced power consumption. Even though only measurements with reduced accuracy are possible in this mode of operation, this is sufficient for many applications. The mode of operation with increased power consumption is only used if measurements of higher accuracy are necessary.

Preferably, the heating pulses are at least five times, preferably ten times, shorter than the distance between consecutive heating pulses.

BRIEF DESCRIPTION OF THE DRAWINGS

Further embodiments, advantages and applications of the invention become apparent from the dependent claims and the now following description making reference to the figures, wherein:

WAYS FOR CARRYING OUT THE INVENTION

Figure 1:
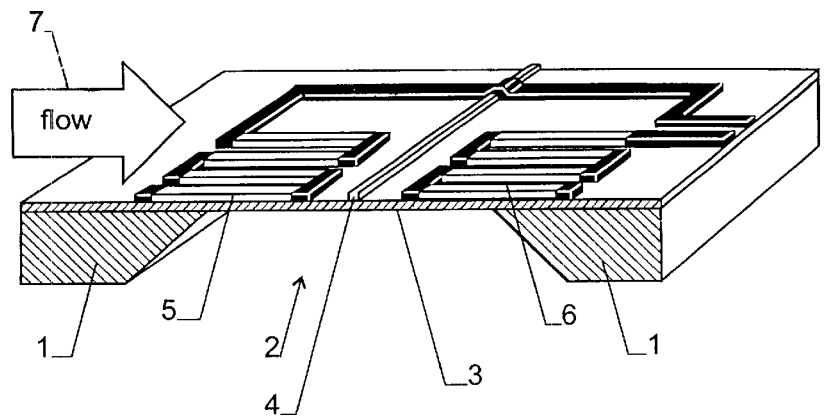
FIG. 1 is a perspective view and a central sectional view of the arrangement of the heating element and the temperature sensors.

In a preferred embodiment of the flow sensor according to the invention a sensor device as shown in FIG. 1 is used. This device is described in detail in "Scaling of Thermal CMOS Gas Flow Microsensors: Experiment and Simulation" by F. Mayer et al., in Proc. IEEE Micro Electro Mechanical Systems (IEEE, 1996), pp. 116ff.

It is arranged on a silicon single crystal 1, into which an opening or recess 2 has been etched. The opening or recess 2 is covered by a thin membrane 3 made of a dielectric. A resistive heating element 4 is arranged on membrane 3. Two thermocouples 5, 6 are arranged symmetrically in respect to the heating element 4 and serve as temperature sensors. The thermocouples 5, 6 and the heating element 4 are arranged in such a manner in respect to the flow direction 7 that the medium to be measured first passes the first thermocouple 5, then the heating element 4 and finally the second thermocouple 6.

As described in the document mentioned above, the mass flow of the medium to be measured can be determined by a device according to FIG. 1. For this purpose, the temperature difference between the thermocouples 5, 6 is measured, which depends from the flow velocity as well as from the density and pressure of the medium. By means of suited calibration tables, the mass flow can then be calculated from the temperature difference.

Figure 2:
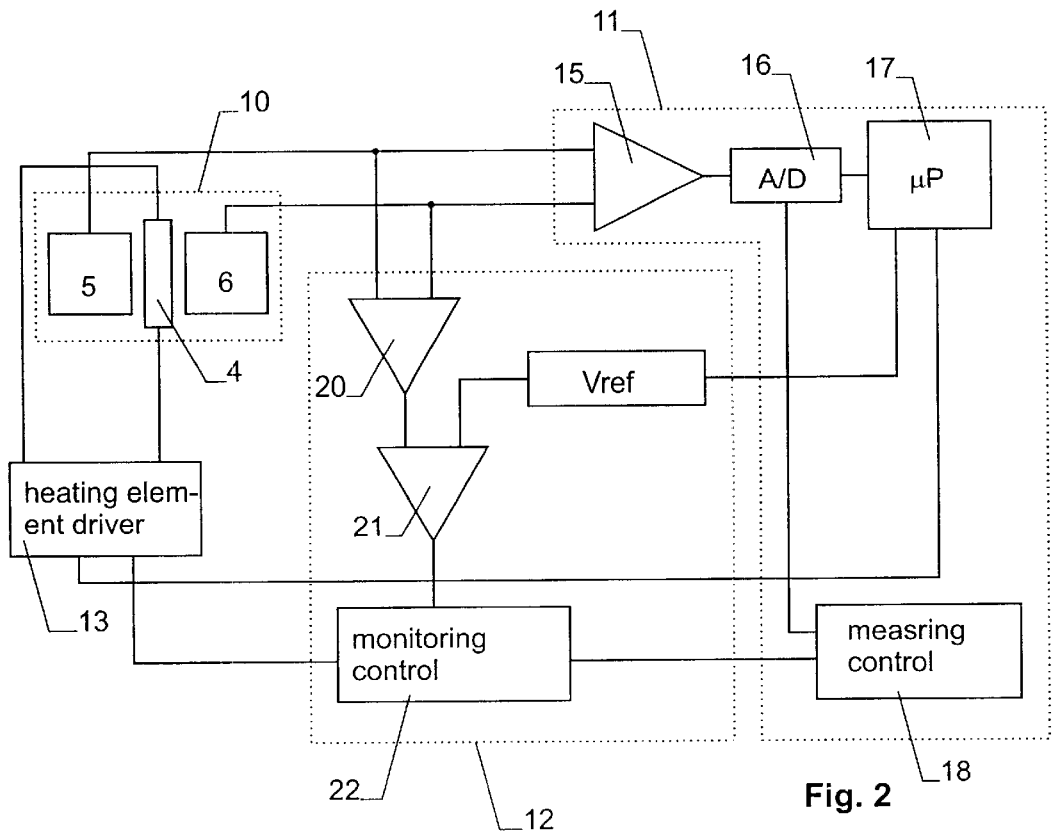
FIG. 2 is a simplified block diagram of a first embodiment of the flow sensor according to the invention.

For measuring the mass flow a circuit as shown in FIG. 2 can be used. It comprises the actual sensor section 10 with the heating element 4 and the thermocouples 5, 6, a measuring section 11 for processing the signals from the sensor section 10 and for calculating the mass flow, an optional monitoring circuit 12, the object of which is described further below, as well as a driver 13 for the heating element 4.

The measuring section 11 comprises a precision amplifier 15, which amplifies the difference of the temperature signals of the thermocouples 5, 6. The difference signal amplified in this way is fed through a analog-digital converter 16 to a microprocessor 17. The microprocessor 17 uses a calibration table for determining the mass flow from the difference signal. The task of the microprocessor can also be carried out by the converter 16 if the latter operates non-linearly in suitable manner.

The measuring section 11 further comprises a measuring control 18, which controls, inter alia, the power fed to the parts 15–17, and the functions of which are further described below.

Figure 3:
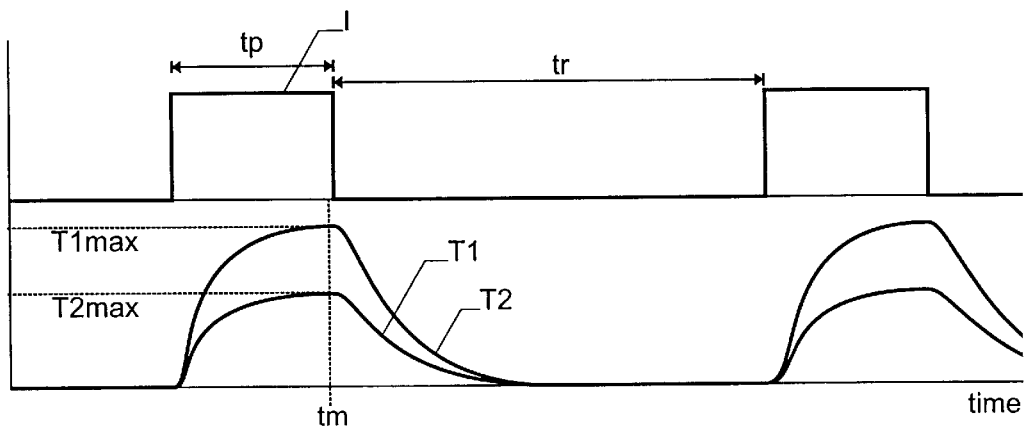
FIG. 3 is a diagram with the heating current and the signals from the temperature sensors.

For keeping power consumption low, the device is operated in cycles and pulses. This is shown in FIG. 3.

The microprocessor 17 or the measuring control 18 sends pulses to the driver 13, which generates corresponding current pulses I of a length tp of e.g. 40 ms for the heating element 4. Between the current pulses the heating element 4 is not heated (or only heated in reduced manner) during periods of a length tr of e.g. 2 seconds.

The length tp of the current pulses I is chosen such that the temperatures T1, T2 of the thermocouples 5, 6 reach their equilibrium values T1max and T2 max at the end of each pulse. Therefore, the microprocessor can measure the temperature difference T2max–T1max at the time tm and process it in conventional manner.

Thermocouples are more suited for measuring the temperature pulses than resistors because thermocouples tend to show less drift and aging under pulsed temperature changes than resistors.

By means of this pulsed operation of the device the power consumption of the heating element 4 can be decreased considerably. In order to each good power savings, the pulse length tp should be at least five times, preferably at least ten times smaller than the second cycle length tr.

To further reduce power consumption, various additional measures can be used alternatively or in combination. These are described in the following.

A first measure consists in that the sensor has two modes of operation, which are selected by measuring control 18 or monitoring control 22. In the first mode of operation, the length tp of the pulses is e.g. reduced to 10 ms and the measurement is carried out correspondingly earlier. In this case the length of the pulses is not sufficient to reach the thermal equilibrium. It is, however, still possible to perform a measurement of slightly reduced accuracy. In the second mode of operation the full pulse width tp of e.g. 40 ms is used.

The modes of operation are either selected automatically (for example, the first mode of operation is used normally and the second mode of operation is only applied for calibrating or a measurement of increased accuracy), or they can be selected intentionally from outside.

An important advantage of this first measure for reducing power consumption lies in the fact that it requires no additional circuit elements.

For a further reduction of the power consumption the resolution of the A/D converter 16 can be made dependent on the mode of operation. In the first mode of operation, only a small amount of time is available for the measurement and, furthermore, the measuring results are less accurate. Therefore, the A/D converter 16 is operated with reduced resolution in this mode of operation. This accelerates the measurement. Furthermore, the power consumption of the A/D converter 16 is reduced. In the second mode of operation, the A/D converter is operated with full resolution.

A further measure for reducing the power consumption uses the monitoring circuit 12 mentioned above. It comprises a amplifier 20, the output signal of which is compared in a comparator 21 to a reference voltage Vref. The function of the monitoring circuit 12 is controlled by a monitoring control 22. The monitoring control 22 is connected to the measuring control 18 and is able to switch the measuring section 11 on and off.

The monitoring control 12 allows to operate the device in two modes. In a first mode (monitoring mode) the monitoring control 22 deactivates the measuring section 11, and the monitoring circuit 12 monitors the state of the sensors, as it is described further below. In a second mode (measuring mode), the monitoring control 22 activates the measuring section 11, and the measuring section 11 carries out the normal pulsed measurements in the manner described above.

In the monitoring mode, the monitoring control 22 assumes the control of the heating element driver 13 and generates, as in FIG. 3, short heating pulses, which lead to corresponding temperature changes at the thermocouples 5, 6. The corresponding temperature signals are amplified in amplifier 20 and the temperature difference T2max–T1max is compared to the reference value Vref in comparator 21.

As long as the temperature difference remains below the reference value Vref, it can be assumed that the flow speed of the medium to be measured is so small that it can be neglected. An accurate measurement is in this case unnecessary and the measuring section 11 does not have to be activated. As soon as the temperature difference exceeds the reference value Vref, however, the monitoring control 22 activates the measuring section 11, which then carries out more accurate measurements.

The monitoring circuit 12 is preferred to be designed using largely analog circuitry and designed to be as simple as possible, by means of which its power consumption can be reduced, which, however, also limits its accuracy. Therefore, the measuring section 11 is periodically activated during monitoring mode for calibrating the monitoring circuit, even if the temperature difference remains below reference value Vref. In such a calibration phase, the measuring section checks if the measured mass flow is below a given threshold. If yes, the reference value is reduced by a correction value. If no, it is increased correspondingly.

With the monitoring circuit 12 the power consumption can be reduced because the complicated measuring section 11 remains switched off during periods of low mass flow. This is especially important for measuring environments where the mass flow is low during longer periods.

Figure 4:
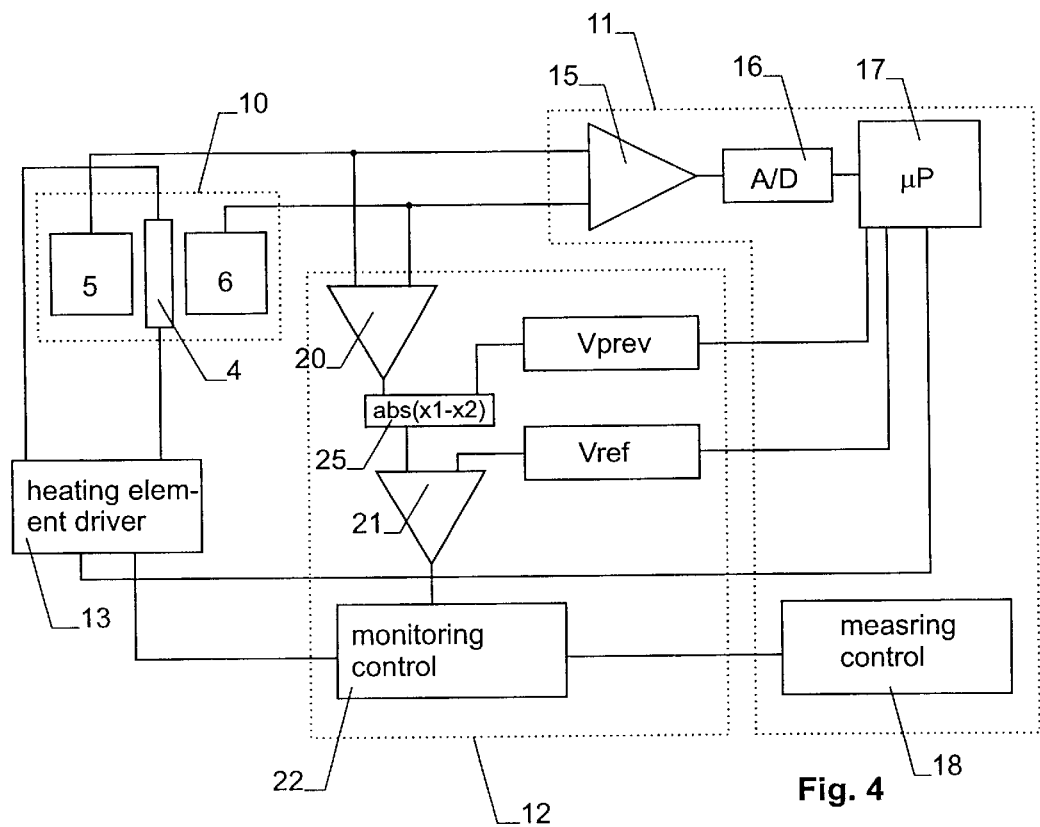
FIG. 4 is a second embodiment of a flow sensor according to the invention.

In measuring environments where only weak variations of mass flow are to be expected, another embodiment of the monitoring circuit 12 can be used, as it is shown in FIG. 4. Here, the microprocessor 17 generates, in addition to the reference value Vref, a comparison value Vprev. The output value Vout of the amplifier 20 is fed to a circuit 25 together with comparison value Vprev, which calculates the absolute difference Vout—Vpref of these two values. This absolute value is now compared to the reference value Vref in comparator 21.

The method of operation of the embodiment of FIG. 4 corresponds to the one of FIG. 2 with the exception that the monitoring control 22 activates the measuring section 11 as soon as the temperature difference signal of the two temperature sensors deviates by a given value from the comparison value Vpref.

When the measuring value 11 has measured a value, it stores the corresponding difference signal of the temperature sensors as comparison value Vprev. Then it is deactivated. Now the monitoring circuit 12 measures the deviation from the comparison value. As soon as this deviation exceeds the reference value Vref, the measuring section 11 is activated again for carrying out a next measurement and generating a new comparison value Vprev. In this way the measuring section 11 is only activated when the signal has changed.

In addition to this, the measuring section can also be activated in this embodiment periodically for calibrating the monitoring section and updating the values Vref and Vprev.

If, in the embodiment of FIG. 4, the comparison value Vperv is set equal to zero, it substantially corresponds in its function to the one of FIG. 2. Basically, the monitoring circuit can also check the signals of the temperature sensors against other or further threshold conditions than the ones disclosed in the embodiments of FIG. 2 and 4.

In the embodiments shown so far, the monitoring circuit 12 as well as the measuring section 11 operate the heating element 4 in pulsed manner. It is, however, also possible that e.g. only the monitoring circuit 12 uses a pulsed operation, while the measuring circuit 11 leaves the heating element switched on during its whole time of activation. It is furthermore possible that the monitoring circuit 12 uses heating pulses of smaller energy than the measuring circuit because it needs lower accuracy.

Typical pulse lengths tp for a sensor geometry according to FIG. 1 are in the range of 15–50 ms if it should be waited until a thermal equilibrium is reached at the temperature sensors. It is, however, also possible to use shorter pulses down to approximately 1 ms—in this case, the equilibrium temperatures T1max, T2max can e.g. be determined by extrapolation.

Preferably, no current flows through the heating element between two heating pulses. It is, however, also conceivable to operate the heating element at a base power continuously in order to reach the operating power more quickly.

The circuit elements of FIG. 2 and 4 can be integrated in part or completely on the silicon carrier 1 of the device. They can, however, also be implemented as external components.

While the present application describes preferred embodiments of the invention, it must be pointed out that the invention is not limited thereto and can also be carried out in different manner within the scope of the following claims.

What is claimed is:

1. Method for measuring the mass flow of a gas or a liquid, comprising the steps of
    leading the gas or the liquid over a first temperature sensor that produces a first temperature signal, a heating element and a second temperature sensor that produces a second temperature signal,
    operating the heating element in cycles for saving heating energy, wherein in a first cycle phase the heating element is operated at higher temperature than in a second cycle phase, wherein the first cycle phase is shorter than the second cycle phase, and
    determining the mass flow from the respective first and second temperature signals of the two temperature sensors.

2. Method of claim 1 wherein the mass flow is determined from the difference of the temperature signals of the two temperature sensors.

3. Method of claim 1 wherein the first cycle phase is at least temporarily chosen of such length that a thermal equilibrium is reached in the region of the temperature sensors.

4. Method of claim 1 wherein the temperature sensors and the heating element are arranged at least partially on a dielectric membrane, which membrane is arranged on an opening or a recess in a semiconductor device.

5. Method of claim 1 wherein two different modes of operation are provided, wherein in a first mode of operation heating pulses of a first length are generated and in a second mode of operation heating pulses of a second length are generated, wherein the first length is smaller than the second length, and in particular wherein the first length is so small that at its end no thermal equilibrium is reached in the region of the temperature sensors.

6. Method of claim 1 wherein the first cycle phase is at least five times shorter than the second cycle phase.

7. Mass flow sensor for determining the mass flow of a gas or a fluid comprising
    two temperature sensors arranged in a flow direction one after the other and producing respective first and second temperature signals,
    a heating element arranged between the temperature sensors and
    measuring means for determining the mass flow from the respective first and second temperature signals of both temperature sensors and comprising a pulse control for feeding energy in pulses to the heating element for generating heating pulses, wherein a distance of consecutive pulses is longer than the pulses themselves.

8. The mass flow sensor of claim 7 wherein the pulse control is designed such that at least part of the heating pulses are long enough that the temperature sensors are substantially in thermal equilibrium at the end of a heating pulse.

9. The mass flow sensor of claim 7 wherein the heating element and the temperature sensors are at least partially arranged on a dielectric membrane extending over an opening or recess in a semiconductor device.

10. The mass flow sensor of claim 7 wherein the measuring means comprises a monitoring circuit and a measuring section activated by the monitoring circuit, wherein
    the measuring section is designed for determining the mass flow depending on the temperature signals, and wherein
        the monitoring circuit is designed for periodically monitoring the temperature signals and for activating the measuring section if the temperature signals fulfill a given threshold condition.

11. The mass flow sensor of claim 10 wherein the measuring section is designed for calibrating the monitoring circuit.

12. The mass flow sensor of claim 7 wherein the pulse control generates, in a first mode of operation during operation of the monitoring circuit, first heating pulses and, during operating of the measuring section, second heating pulses, wherein the first heating pulses have less energy than the second heating pulses.

13. The mass flow sensor of claim 10 wherein the threshold condition is determined from the deviation of a difference of the temperature signals from a given comparison value.

14. The mass flow sensor of claim 7 wherein the temperature sensors are substantially symmetrically arranged on the sides of the heating element.

15. The mass flow sensor of claim 7 having two modes of operation, wherein in a first mode of operation pulses of a first length are generated and in a second mode of operation pulses of a second length are generated, wherein the first length is smaller than the second length, and in particular wherein the first length is small enough that, at its end, no thermal equilibrium is reached in the region of the temperature sensors.

16. The mass flow sensor of claim 15 comprising a digital analog converter with adjustable resolution, wherein the resolution is set to be smaller in the first mode of operation than in the second mode of operation.

17. The mass flow sensor of claim 7 wherein the temperature sensors are thermocouples.

* * * * *